United States Patent [19]
Schanning et al.

[11] Patent Number: 5,177,788
[45] Date of Patent: Jan. 5, 1993

[54] NETWORK MESSAGE SECURITY METHOD AND APPARATUS

[75] Inventors: Brian Schanning, Marblehead; Sadredin Tavana, Watertown; Steven E. Archambault, Haverhill; Carl G. Hayssen, III, Andover, all of Mass.

[73] Assignee: Ungermann-Bass, Inc., Santa Clara, Calif.

[21] Appl. No.: 776,145

[22] Filed: Oct. 15, 1991

[51] Int. Cl.⁵ ............................................. H04L 9/00
[52] U.S. Cl. ................................. 380/23; 380/25; 380/49
[58] Field of Search ........................... 380/23, 25, 49

[56] References Cited

U.S. PATENT DOCUMENTS

| | | | |
|---|---|---|---|
| 4,926,481 | 5/1990 | Collins, Jr. | 380/25 |
| 4,979,832 | 12/1990 | Ritter | 380/49 |
| 5,007,088 | 4/1991 | Ooi et al. | 380/49 |

FOREIGN PATENT DOCUMENTS 2029577  6/1991  Canada .
0431751  6/1991  European Pat. Off. .

OTHER PUBLICATIONS

Michael S. Katzman; "Smart from the Start;" LAN dispatch (an AT&T publication); pp. 22-23; Spring, 1991; United States.

Jonathon L. Howard; "Securing your LAN from Evesdroppers and Intruders;" LAN dispatch; pp. 24-28; Spring, 1991; U.S.

*Primary Examiner*—Salvatore Cangialosi
*Attorney, Agent, or Firm*—Townsend and Townsend

[57] ABSTRACT

A security system for local area networks (LAN) to prevent eavesdropping of or to control access to LAN traffic at repeater or concentrator ports. The security system determines which repeater ports are to have security activated according to a given set of criteria. For ports with security activated, the contents of the data field of data frame transmitted from the repeater port to the local device are replaced with an arbitrary bit pattern.

18 Claims, 5 Drawing Sheets

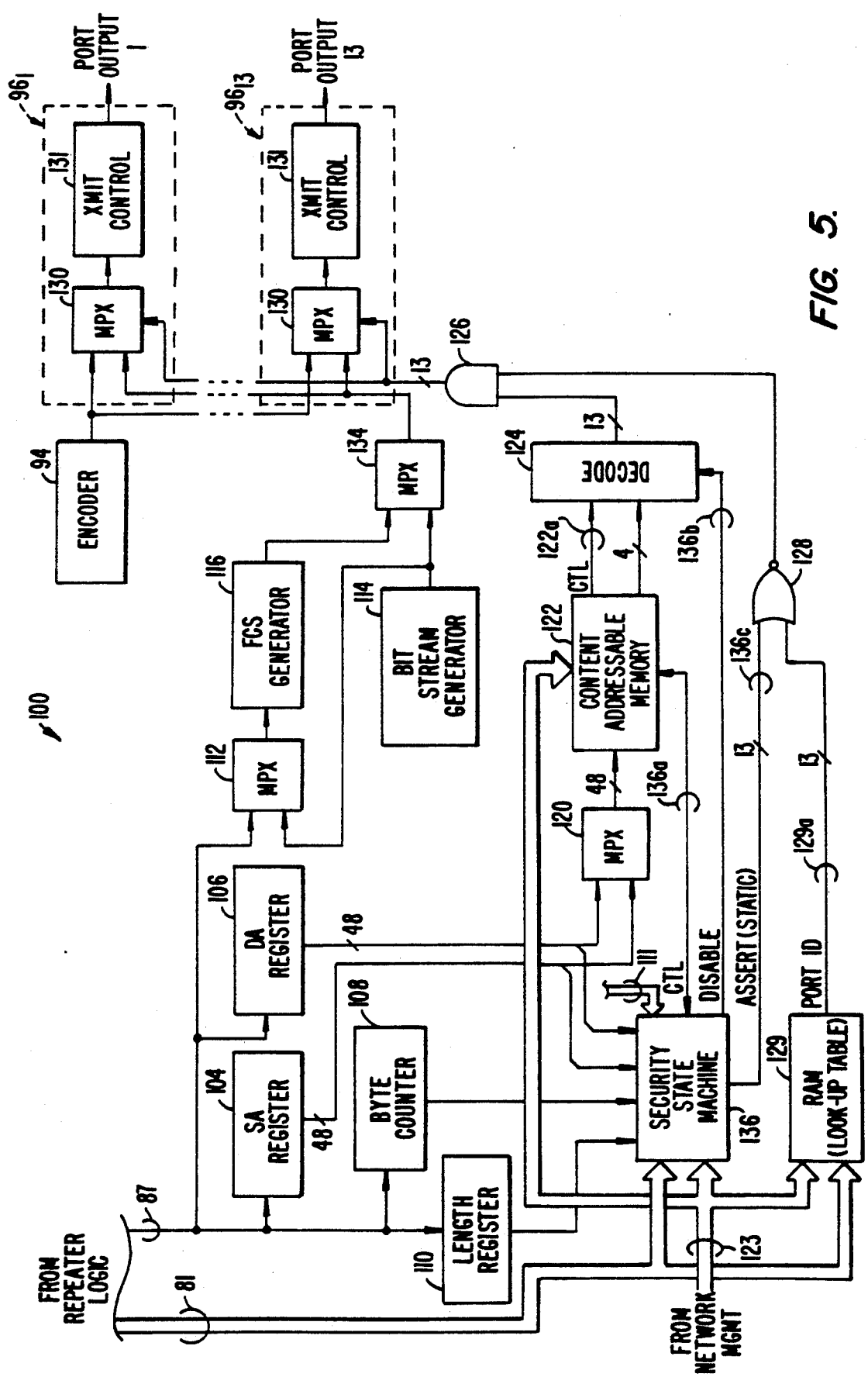

NETWORK MESSAGE SECURITY METHOD AND APPARATUS

BACKGROUND OF THE INVENTION

The present invention relates to secured data transmission in multiuser computer architectures. More particularly, the present invention relates to prevention of unauthorized access to data communicated on local area networks.

A local area network (LAN) is a communications link between data processing equipment located in a limited geographic area. LANs connect personal computers, mini- and mainframe computers, printers and other similar devices implementing a concept that permits programs, data files, and resources to be shared throughout the network.

FIG. 1 contains a diagram of a typical LAN setup. In FIG. 1, the data processing equipment located in a discrete physical area, for example, different buildings, or in a discrete organization, for example, a department, are interconnected to form a local or departmental LAN. In the topology of FIG. 1 these smaller local LANs are interconnected via a backbone 8 by repeaters 10 to form the system-wide LAN.

Repeaters (also known as concentrators or hubs) are devices which regenerate LAN signals received at the repeater input and then output the regenerated signals to individual stations or nodes. Repeaters thus extend maximum network radius. Frames of data applied to any of the repeaters 10 are regenerated by the repeater for faithful rebroadcast to the station(s) or node(s) to which the individual repeater is connected. As illustrated by the repeater 10-3 of FIG. 1, repeaters 10 may also be connected to other repeaters.

The local departmental networks depicted in FIG. 1 may also contain routers and/or bridges 14. The bridges and routers serve to isolate the strictly local departmental traffic from the backbone traffic. Backbone traffic not destined for a local station is not forwarded across the bridge to the departmental LAN. Similarly, strictly local traffic is not forwarded across the bridge and placed on the backbone.

The bridge, however, does nothing to protect the interdepartmental and local traffic on the departmental LAN from being observable by all stations within that departmental LAN. This fact is especially applicable in broadcast based communications protocols, such as Ethernet, wherein all communications within the given LAN are received by all stations in that LAN. Sensitive and valuable user data is thus available to "promiscuous mode" or eavesdropping reception by any station connected to the departmental LAN. The eavesdropping connection can be made on any convenient place on the LAN (e.g., an office outlet) and is virtually undetectable.

The security threat presented by potential eavesdroppers has become increasingly credible as LAN equipment, personal computers, and portable network diagnostic equipment prices continue to drop, thereby making the equipment to eavesdrop readily available. Eavesdropping is also simpler to implement and more difficult to detect than in the past because LAN networks can now be interconnected with the same wiring systems used for telephones rather than the specialty cables required under other, earlier standards.

Merely suspending transmission of data to nodes that are not authorized to receive the data is an unsatisfactory solution in LANs using broadcast-based communication protocol. To do so may result in unacceptable collisions when stations on the "quiet" nodes, seeing no communications traffic, begin transmitting data despite the presence of communications traffic on other nodes of the LAN.

Some limited methods for access control security to counter the eavesdropping threat do exist. However, these existing methods are themselves subject to interception on the LAN. For example, a password, even in its encoded form, must travel through the network and is subject to interception.

SUMMARY OF THE INVENTION

The present invention provides a method and apparatus for countering the eavesdropping threat and for controlling access to LAN data transmissions within the local LAN. Broadly, the present invention provides LAN security by removing, at selected transmit ports of a repeater unit, the information contained in a data frame received by the repeater, and substituting therefor an independent bit pattern. The security processing can be selectively controlled at the network management or user level.

According to embodiments of the invention, the security process of the present invention may be implemented statically or dynamically. If implemented statically, security will be activated for all data frames transmitted from a given transmit port of a repeater. If implemented dynamically, security will be selectively activated only for certain data frames transmitted from a given transmit port while other data frames are faithfully transmitted from other transmit ports. The data frames for which security is dynamically activated can be determined by the destination address, source address, receiving port identification or other variables or combinations thereof.

According to other embodiments of the present invention, the security process may be either transparent or non-transparent to the LAN. If security is transparent, a valid, although altered, data frame is transmitted. In transparent security the frame check sequence is recalculated to account for the alteration of the data frame made by the substitution of the frame's data field. If security is implemented non-transparently, the frame check sequence field is not recalculated and an invalid frame is transmitted from the repeater to the attached device.

BRIEF DESCRIPTION OF THE DRAWINGS

FIG. 5 is a block diagram of a bit substitution pattern generation and repeater architecture according to an embodiment of the present invention.

DESCRIPTION OF SPECIFIC EMBODIMENTS

Figure 1:
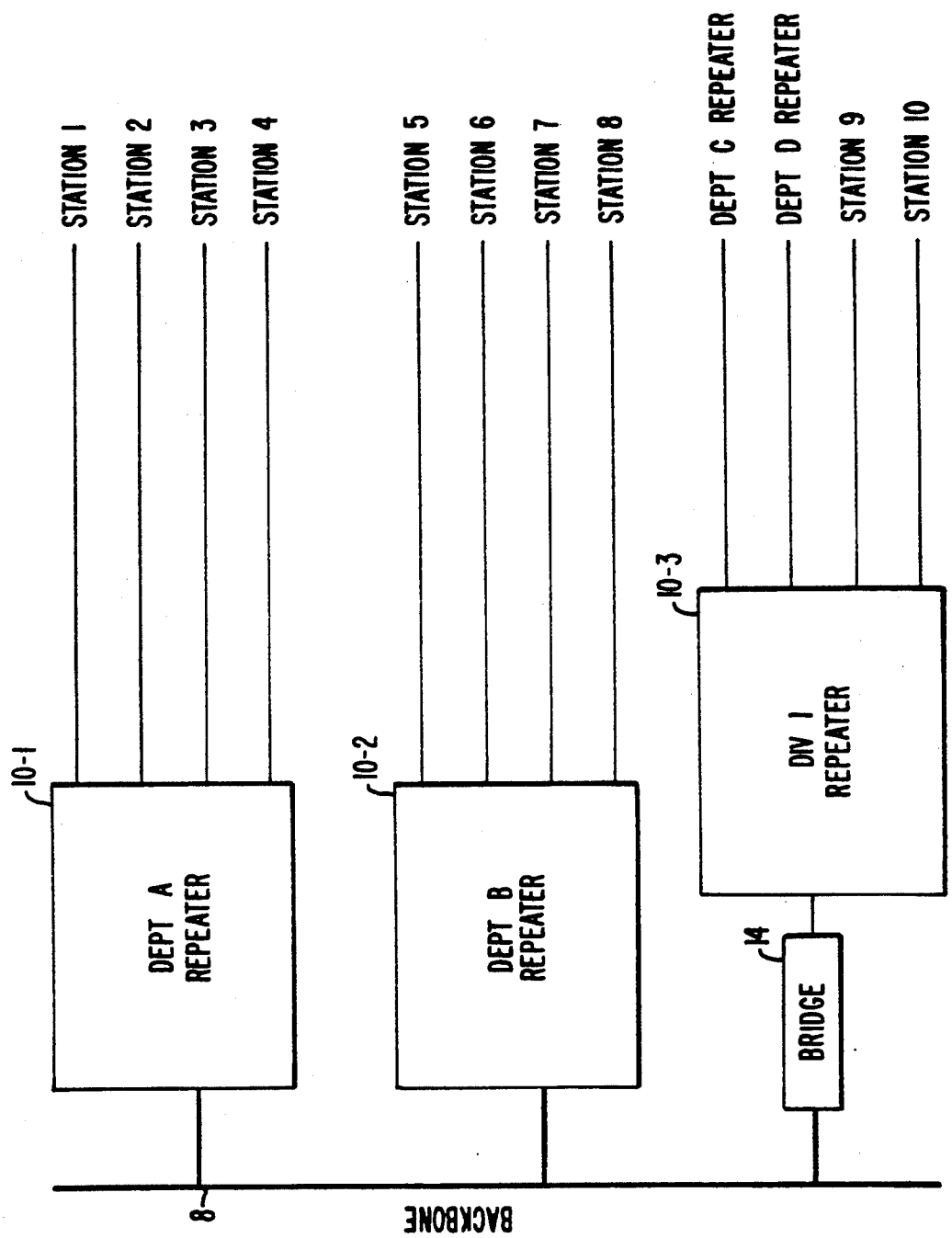
FIG. 1 is a block diagram of a local area network.
Figure 2:
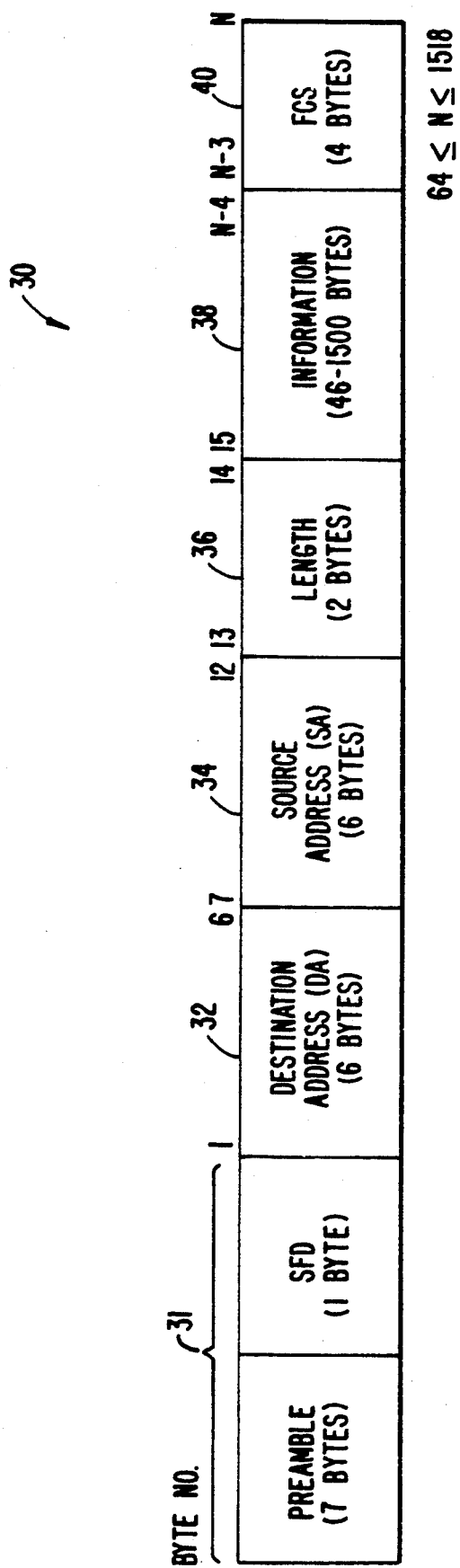
FIG. 2 is a diagram of a medium access control data frame format according to IEEE standard 802.3.

FIG. 2 contains an example of a data transfer frame 30 according to IEEE standard 802.3 for use in LAN data transmission of the type illustrated in FIG. 1. As FIG. 2 illustrates, the data frame 30 contains five fields, 32-40, of information that follow the preamble and a start frame delimiter (SFD) fields 31. A six-byte destination address (DA) field 32, indicates the node or station for which the data frame 30 is destined; a six-byte source address (SA) field 34 identifies the node or station sending the data frame 30; a 2-byte field 36 specifies the length of the data contained in an information field 38 which may be 46-1500 bytes long. The final field of the data frame 30 is the frame check sequence (FCS) field 40. A frame check sequence field 40 assists in error detection, and typically, contains an n-bit number having a value F that is appended to the k bits contained in fields following the extent of the frame form a k+n bit quantity. The value of F is computed by the sending device so that the k+n bit quantity, when divided by a predetermined n+1 bit number P, results in a predetermined n-bit remainder R. The device receiving the data frame divides the k+n bit portion of the frame by P and, if the resulting remainder is equal to R, assumes there are no errors contained in the data frame. Otherwise it is assumed that an error has occurred somewhere with the k+n bit quarterly. In the IEEE 802.3 example, n=32 and the CRC-32 system for computing F is specified. A detailed discussion of LAN architectures and data transfer standards may be found in *The Handbook of Computer Communications Standards*. Vol 2, 2d Ed. by William Stallings, Ph.D; Howard Sams & Co., 1990.

Operational Overview

In the present invention, LAN security is provided by removing, at selected transmit ports of a given repeater unit, the data contained in the information field 38 of the data frame received by the repeater, substituting therefor an independent bit pattern for transmission on the LAN to nodes or stations having no need to receive the data frame (i.e., unauthorized destinations). At the same time, the data frame 30 is faithfully transmitted from other ports to the authorized destinations. In this manner, valid data is received only at stations or nodes connected to authorized transmit port of the repeater unit. Eavesdropping stations attached to other ports receive only frames with the substituted bit pattern.

Although the IEEE 802.3 LAN standard is discussed herein, the present invention may be used on other types LAN configurations, such as those using other Carrier Sense Multiple Access with Collision Detection (CSMA/CD) standards or protocols.

The eavesdropping protection provided by the present invention may be implemented in two ways: non-transparently and transparently. In either implementation, the independent bit pattern can be statically or dynamically substituted for frames received and/or transmitted.

Non-Transparent Security

Non-transparent eavesdropping protection will result in transmission of a data frame that is not a legal frame according to the communications protocol implemented by the LAN (i.e., IEEE 802.3). In addition to the data contained in the information field, any or all other bits in the frame, including the preamble and start frame delimiter field 31 may also be replaced with an independent bit pattern. Any station connected to a transmit port of the repeater with non-transparent security activated will be able to send traffic in accordance with the CSMA/CD medium access control protocol, but will be unable to receive any valid data frames—except those authorized for that port.

Non-transparent eavesdropping protection has the advantage of being inexpensive and easy to implement. As discussed below, transparent protection depends upon being able to identify the data frame and its content (e.g., the start of the frame, the beginning of the various fields, etc.). In addition, under the popular Ethernet local area network (LAN) protocol (as opposed to IEEE 802.3) it is even more difficult to implement eavesdropping security transparently since there is no way for the repeater (without including an even more complex circuitry to interpret information in upper layer protocol) to determine in advance the length of the data frame and thus the start of the FCS field. Thus, in this case, the re-calculated FCS cannot be substituted for the last four bytes of the data frame. Lengthening the frame by four bytes would adversely impact the operation of the carrier sense multiple access with collision detection (CSMA/CD) protocol mechanism.

Transparent Security

When eavesdropping protection is implemented transparently, the resulting data frame is correctly formed. At a minimum, the information field 38 is replaced with an independent bit pattern, in effect obliterating the information content of the data frame; other particulars (e.g., source address) may remain the same, except that a re-calculated FCS must replace the original FCS to reflect the substitution of the independent bit pattern. In transparent protection, the security logic of the repeater unit supports the usual IEEE 802.3 repeater process up until start of the bit pattern substitution process. Depending upon the type of security active (i.e., static or dynamic), this may begin at any point after the Start Frame Delimiter, but no later than the beginning of the information field 38 containing user data. At this point, all subsequent bits of the frame (except the length fold 36) through the information field 38 are modified by substituting the output of a bit pattern generator. At the end of the replacement information field, a new frame check sequence field 40 that has been recomputed using the new frame contents is also substituted as the final field of the frame. The result is a completely legal IEEE 802.3 frame, which has had its information contents (and possibly its source and/or destination address) completely overwritten.

The integrity of the basic CSMA/CD media access control protocol is preserved in both the transparent and non-transparent security processes by ensuring that the number of bits in all repeated frames are identical, regardless of whether they are substituted for or not. Any security process in which bit repetition out unauthorized ports is merely suspended results in unacceptable collisions if stations on those "suspended" ports start transmitting despite the presence of traffic on other ports. In the case of transparent eavesdropping protection, the integrity of the IEEE 802.3 frame format is also preserved by leaving the length field (and possibly the source and destination address fields) unchanged and recomputing and substituting the frame check sequence field to produce a well-formed and legal IEEE 802.3 frame. This recalculation prevents misleading frame check sequence error counts being registered by stations attached to the secured port.

Both transparent and non-transparent security can be implemented statically or dynamically for all frames on a particular transmit port.

Static Security

Implementing security statically on a given transmit port results in all data frames transmitted from that port being encoded with the substitute bit pattern without regard to the source address, destination address, or the like of each received data frame. A station connected to this port could not eavesdrop on any traffic, even traffic addressed to that station. Static security thus prevents any reception of unaltered frames by a station connected to this transmit port when static security is activated, but allows the station to communicate one-way (i.e., transmit) to other stations on the network. For example, a station might first authenticate itself (e.g., a password) to an access control server that then deactivates the state security for the appropriate port if the requesting station/user is authorized full connectivity. Confidentiality and access control security services are thus both supported by this implementation.

Dynamic Security

Dynamic security permits security selection to be based on criteria that are particular to each individual data frame such as, for example, the destination address of the data frame. Thus, for example, dynamic security may be activated by comparing the frame's destination address with those authorized for a particular port. A receiving station attached to that port would not be able to eavesdrop on traffic addressed to other stations (no match), but continues to enjoy full reception of frames addressed to it (match).

Figure 3:
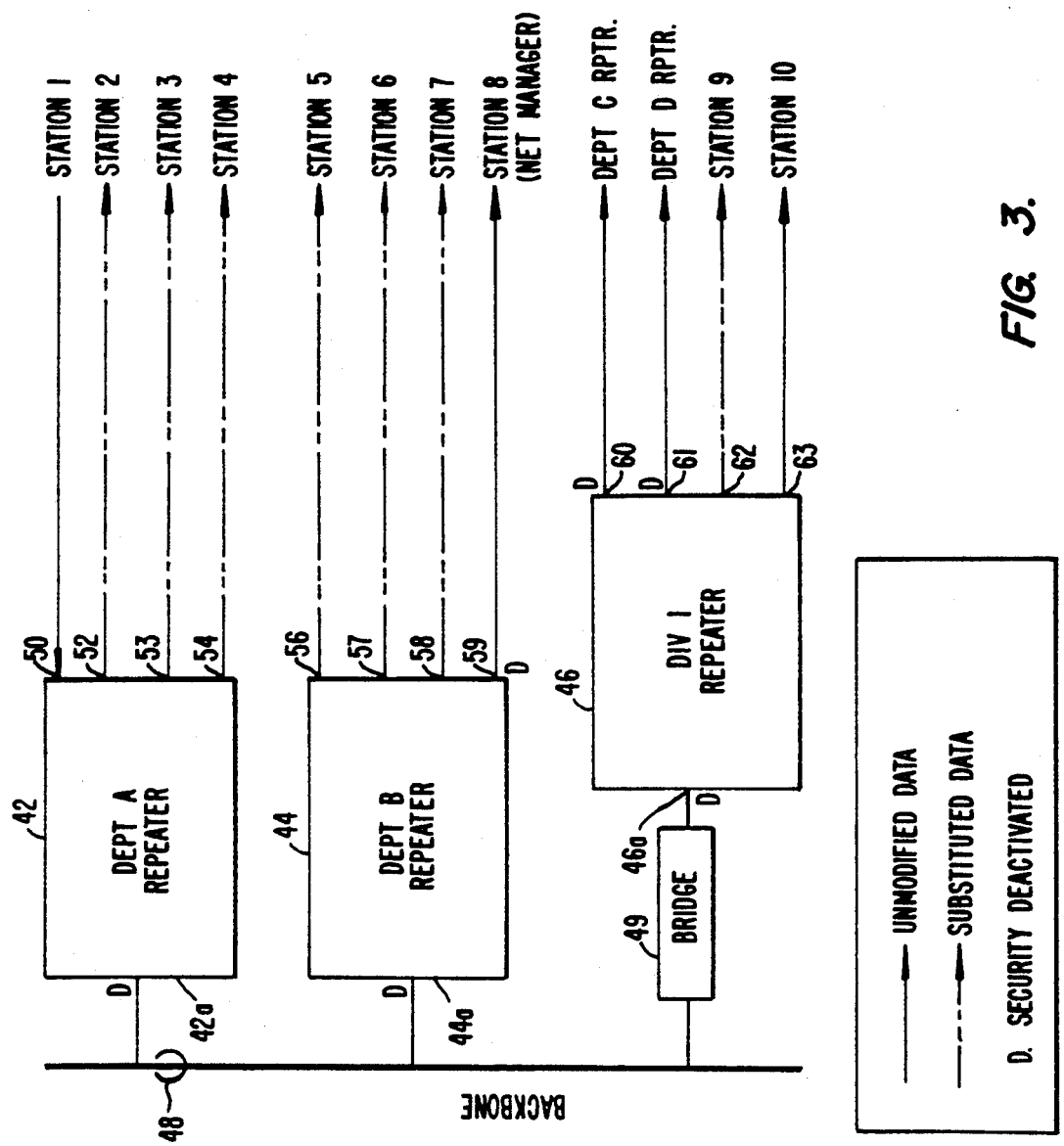
FIG. 3 is a block diagram of a local area network in which security has been activated dynamically according to an embodiment of the present invention.

The concept of dynamically implemented eavesdrop security is better understood with reference to FIG. 3, which illustrates a LAN including repeater 42, 44, 46 having transmit/receive ports 42a, 44a, and 46a connected to a backbone communication link 48 (the repeater 46 being connected via a bridge unit 49). Insofar as FIG. 3 shows, the repeater unit 42 receives at input port 50 data frames that are communicated from a station 1; data is communicated from the repeater unit 42 to stations 2, 3, and 4 via transmit ports 52, 53, and 54, respectively. Similarly, the repeater unit 44 has stations 5, 6, 7, and 8 (this latter being a Net Manager station) connected to transmit ports 56, 57, 58 and 59, respectively.

The repeater unit 46 is connected via transmit ports 60 and 61 to input ports of other repeaters, while the transmit ports 62 and 63 are connected to stations 9 and 10.

Certain repeater ports of the LAN of FIG. 3 have security dynamically activated. Ports 50, 52, 53, 54, 56, 57, 58, 62, and 63 have been assigned authorized destination addresses corresponding to stations 1, 2, 3, 4, 5, 6, 7, 9, and 10, respectively.

Certain repeater ports of the LAN of FIG. 3 preferably have eavesdrop security disabled. Such is the case for the transmit ports 42a, 44a and 46a of the repeater units 42, 46, 48. One reason is that to implement security at these points would be redundant since it can also (and most likely will—in this example) be implemented at a transmit port further downstream the communication path. For basically the same reason eavesdrop security is disabled at the transmit ports 60 and 61 that connect to the Departments C and D repeaters. Another reason is that some stations must be given access to all traffic. For example, the Net Manager station (station 8) connected to port 59 has eavesdrop security disabled so that it can be given access to all LAN traffic for operational reasons.

In FIG. 3 the transmit ports having eavesdrop security disabled are identified with the letter "D" adjacent thereto.

FIG. 3 illustrates destination based, dynamic eavesdrop security. Assume station 1 assembles and transmits a data frame destined for station 10. The repeater unit 42 will receive the data frame (at input port 50) and communicate it to its transmit ports 42a, 52, 53, and 54. Since eavesdrop security at transmit/receive port 42a is disabled, the data frame will be passed, unaltered, onto the backbone connection 48 for receipt by the repeater units 44, 46 (via bridge 49) at their respective transmit/receive ports 44a, 46a.

The transmit ports 52, 53, 54 of the repeater unit 42 also send the data frame. However, since station 10 is not an authorized destination address for any of those transmit ports, eavesdrop security will be implemented by replacing the information field 38 (FIG. 2) with an independent bit pattern. All other aspects of the data frame (e.g., destination address, source address, etc.) remain unchanged, with the exception of the FCS field; it will be computed to reflect the data frame as sent, including the independent bit pattern now contained by the information field 38.

In similar fashion the transmit ports 56, 57, 58 of the repeater 44 will note that the data frame is destined for a station other than which is authorized for the transmit port and implement eavesdrop security (i.e., replace the information field 38 with an independent bit pattern). Since the transmit port 59 has eavesdrop security disabled, the data frame will be communicated, undisturbed, to station 8.

The repeater unit 46 will likewise pass the received data frame to its transmit ports 60-63. The data from Station 1 will be communicated unchanged from the transmit ports 60 and 61 since eavesdrop security is disabled. Eavesdrop security, being enabled on the transmit port 62, and the destination address (Station 10) not being authorized for transmit port 62, will result in a modified data frame with the original information removed being delivered to Station 9.

Station 10, the destination of the data frame from Station 1, is connected to the transmit port 63. The repeater recognizes this fact (by comparing the destination address of the data frame with the address authorized for port 63) and forgoes instituting eavesdrop security, communicating the data frame in its true form to Station 10.

Security on a particular transmit port can be determined on a per-frame basis using the destination address field as illustrated above, but also by using a logical combination of the receiving port identification, the frame's destination address and/or source address to make the security decision. Thus, other stations (e.g., Stations 3 and 4—FIG. 3) may also be permitted to receive the original data frame, in addition to the destination (e.g., Station 10) by authorizing ports 53 and 54 to transmit traffic unaltered if it came from port 50, was sent by Station 1 and/or was sent to Station 10. The bit substitution process can be the same in each case except the timing of the security decision will vary. For example, for decisions based solely on the receive port identification, the security process is identical to that of address-based bit substitution, except that the decision to alter the information field can be made much earlier in the process of frame relay (i.e., prior to the start of the destination address field). If it is desirable, bit substitution can begin as soon as the combinatorial logic is satisfied, consistent with the transparency requirements chosen.

Repeater Architecture

Figure 4:
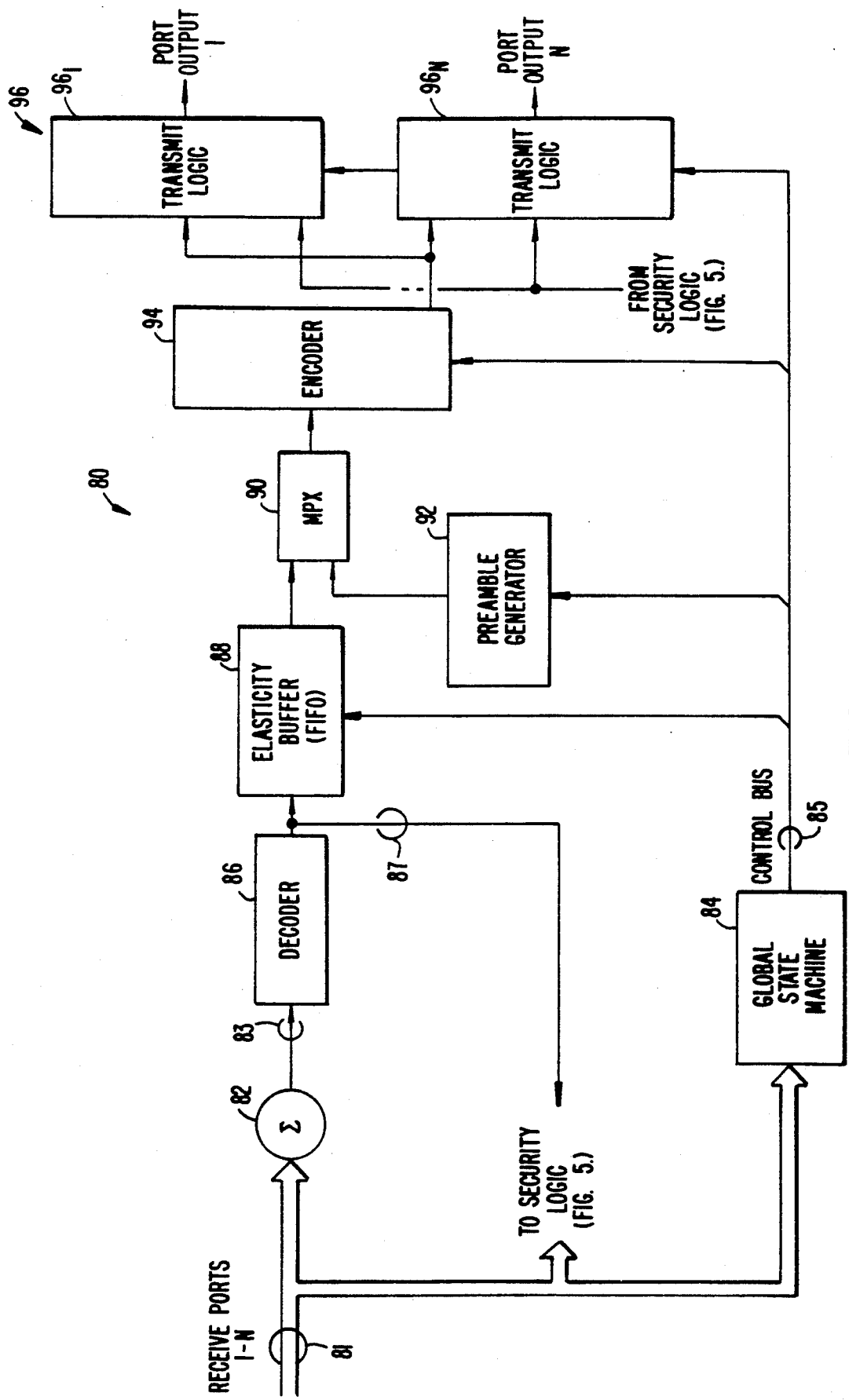
FIG. 4 is a block diagram of an IEEE 802.3 N-port repeater showing modifications according to embodiments of the present invention.

FIG. 4 is a generalized block diagram of a typical IEEE 802.3 N-port repeater modified, as will be further described, according to the teachings of the present invention.

As illustrated in FIG. 4, the IEEE 802.3 N-port repeater unit, designated generally with the reference numeral 80, includes an input unit 82 connected to receive ports 1-N of the LAN (not shown) in which the repeater 80 is connected via signal lines 81. N, here, is 13; thus, the repeater 80 has thirteen (13) receive ports at any one of which a data frame can be received. Since each port 1-N can also function as a transmit port, the repeater 80 will, similarly, have thirteen output ports 1-N. The receiver unit 82 is, in effect, typically nothing more than an OR gate or a wired-OR connection.

The receiver unit conducts the data frame, containing both a clock signal and the data Manchester encoded in the data frame to a decoder 86. The decoder 86 operates to extract the embedded clock signal and data. The data so extracted is applied to an elasticity buffer 88 (i.e., a first in-first out (FIFO) memory) that is used to synchronize the data to the clock signal of the repeater unit 80. The output of the decoder 86 is also conducted (along with the input bus 81) to the security logic of FIG. 5 by a signal line 87.

The output of the elasticity buffer 88 is, in turn, applied to a multiplexer (MPX) 90. which also receives the output of a preamble generator 92. Under control of the global state machine 84, the preamble will be added to the data frame to be communicated by the repeater unit 80, via the MPX 90.

The output of the MPX 90 is applied to an encoder 94, where the data is returned to Manchester coding for transmission, via the transmit logic elements 96, to the thirteen output ports 1-N.

As will be seen, with respect to FIG. 5, in order to incorporate a preferred embodiment of the invention, the transmit logic elements 96 are configured to include multiplex circuitry to selectively communicate the output of the encoder 94 to the corresponding output port, or an independent bit stream from the security logic (FIG. 5).

Control of the elements constituting the repeater unit 80 is maintained by the global state machine 84 in conventional fashion. Responsive to signaling on one of the signal lines of the input bus 81, indicating a data frame is being received at one of the receive ports 1-N, the global state machine 84 will develop control signals that are communicated on the control bus 85 to the various components of the receiver unit 80. For example, when the global state machine 84 detects initiation of signaling on the receive signal lines 81, it will immediately develop control signalling to cause the preamble generator 92 to begin generating a data frame preamble, switch the MPX 90 to couple the preamble generator 92 to the encoder 94, and enable all transmit ports 96 except the one associated with the receive port receiving the data frame (to avoid effecting a collision by trying to "repeat" the data frame back to its sender).

Although the repeater unit 80 can be fabricated in discrete circuitry, there is now available, and preferred, integrated circuitry available from a number of companies, including National Semiconductor Corporation (Part No. DP83950) which will perform the functions of the repeater unit 80. However, using the National Semiconductor product will require multiplex circuitry, as will be seen, to be added at the transmit ports 96 of the product.

Referring now to FIG. 5, there is illustrated the security logic of the present invention, designated generally with the reference number 100, for implementing eavesdrop security. As FIG. 5 shows, the input bus 81 is coupled from the repeater unit 80 (FIG. 4) to a security state machine 136, and a random-access memory (RAM) unit 129. The signal line 87 from the repeater unit 80 is received by source address (SA) and destination address (DA) registers 104, 106, a byte counter 108 and a length register 110. The SA and DA registers operate to capture and hold the source and destination addresses of the data frame being received by the repeater unit 80, while the byte counter 108 operates to count the bytes of the received data frame. The length register will receive and hold the 2-byte length field 36 (FIG. 2).

The state machine 136 that provides the control necessary over various of the elements (e.g., MPXs 112, 120, 134) that constitute the security logic 100. As FIG. 5 illustrates, the state machine 136 receives, via a network management bus 123, command information, enabling it to determine whether or not the security logic 100 will operate in a dynamic or static mode, a mixture of dynamic modes, and whether operation will be transparent or non-transparent.

The signal line 87 also communicates the data frame to one input of a multiplex (MPX) circuit 112. The other input of the MPX circuit 112 receives an output of a bit stream generator 114. The selected signal (i.e., that carried by the signal line 87, or the output of the bit stream generator 114) is applied to a frame check sequence (FCS) generator which develops the FCS that will be added to the data frame when its information field is modified according to the present invention. The FCS calculated by the FCS generator 116 will reflect the modified data frame as a whole.

The bit stream generator 114 produces the independent bit stream used for implementing the eavesdrop security of the invention. The bit stream is a 5 MHz signal (in the case of 10 Mbps Manchester-encoded data) which is a string of alternating ONEs and ZEROs.

The content of the SA and DA registers 104, 106 are selectively applied, via a multiplex circuit 120 (controlled by the security state machine 136), to a content addressable memory (CAM) 122. The output of the CAM 122 is a value that will identify which of the port outputs (FIG. 4) will receive the data frames, and which will have eavesdrop security implemented (based upon the sources or destination address of the data frame), receiving instead the independent bit stream. That value will ultimately operate to control multiplexer circuits 130-1, . . . ,130-N that form a part of the transmit logic elements 96 of the repeater unit 80. The MPX circuits 130-1, . . . 130-N operate to select between the output of the encoder 94, which supplies the data frame received by the repeater unit 80, and the output of the multiplex (MPX) circuit 134—in the first instance, the independent bit stream produced by the bit stream generator 114. The MPX circuit 134, in turn, selects between the bit stream generator 114 and the FCS generator 116.

The CAM 122 is of conventional design, operable to receive a 48-bit "content" and provide in response an 8-bit "address" when the applied value matches the content of one or more locations of the CAM 122. When such a match is identified, the (8-bit) address is loaded in an output register (not shown) of the CAM. If more than one match is found, the results of the first match will be loaded in the output register (not shown) of the CAM 122, and a "match" flag will be set to indicate that other matches were found. As will be evident to those skilled in this art, because of the large number of Ethernet addresses available, the use of a CAM results in a much smaller memory than if a conventional memory were used (i.e., $2^{48} \times 8$ locations for convention memory vs. $2^8 \times 48$ for the CAM 122). Only four of the 8-bits provided by the CAM are used since the repeater unit 80 will typically have only 13 transmit ports (although more, or less, transmit ports can be implemented).

The CAM 122 is connected to the security state machine 136 by a control bus 136a, permitting the state machine to effect control over the CAM for unloading the CAM's output register (not shown). The security state machine 136 is also capable, via the control bus 136a, of determining the state of the match flag of the CAM.

The 4-bit output of the CAM 22 is applied to a decode unit 124. The decode unit 124 includes a register file (not shown) for receiving the addresses from the CAM 22 corresponding to each match identified for the applied source or destination address. The register file (not shown) is loaded by control signals communicated from the CAM 122 by control lines 122a. The contents of the register file (not shown) are combined by the decode unit 124, decoded, and used to form selection signals, one for each MPX 130 that is to pass the data frame from the encoder 94 to the corresponding port output. The CAM 122, therefore, will deliver (under supervisorial control of the security state machine 136) one or more values corresponding to the matches between CAM contents and the value received from the SA or DA registers 104, 106 and applied the input of the CAM 122. The value(s) received by the decoder unit 124 is (are) indicative of one or more of the port outputs to receive the true (unmodified) data frame; conversely, the value(s) will also identify those port outputs designated to receive the independent bit stream provided by the security logic 100. Thus, responsive to the value(s) received, the decode unit 124 will assert a logic ONE on the output line(s) corresponding to the port output to receive the data frame from the encoder 94. Conversely, logic ZEROs will be asserted on the output line(s) of the decode 124 corresponding to the port output(s) not authorized to receive the data frame; these port output(s) will receive instead the bit stream from the security logic 100.

The outputs of the decode unit 124 are individually applied to a corresponding one of an array 126 of two input AND gates. The second input of each AND gate of the array 126 is coupled to receive a corresponding output from an array 128 of NOR gates. When eavesdrop protection is based upon the source or destination addresses contained in the data frame being received, the outputs of the NOR gates will be forced HIGH to enable port output selection by the signals on the outputs of the decoder 124, with the exception that the selection(s) being made, based upon address (source or destination), can be overridden; that is, as will be explained further below, a port output designated to receive the data frame by the address contained in that data frame, can be forced to receive instead the bit stream of the security logic 100 by the output of the NOR gate (corresponding to that port output) being forced LOW.

There is a one-to-one correspondence between each output line of the decoder 124 and transmit logic 96. Similarly, it follows that there is a like one-to-one correspondence between each AND gate of the array 126 and each transmit logic 96.

Each 4-bit value produced by the CAM 122 identifies one of the MPXs 130 that will receive the asserted (i.e., HIGH) signal from the corresponding AND gate of the array 126 will select the encoder 94 to be passed to and through XMIT CONTROL circuitry 131 of the transmit logic 96 for communication onto the associated port output. More than one match for whatever value is applied to the CAM 122 will result in a number of 4-bit values, identifying a number of the transmit logic units 96 to pass the incoming data frame from the encoder 94. All other MPXs 130 are switched to select the output of the bit stream generator 114.

The decoder 124 receives a DISABLE signal, via signal line 136b, from the state machine 136. When asserted, the DISABLE signal operates to disable address-based eavesdrop security, forcing all outputs of the decode 124 to HIGHs. This, in effect, enables all the AND gates of the array 126 for control signalling from the array 128 to implement static eavesdrop security or security based upon which of the receive ports 1-N is receiving the data frame.

As mentioned above, the second inputs of each AND gate array receives an output line from one of an equal number of 2-input NOR gates forming the array 128. Each NOR gate of the array 126 corresponds to one of the transmit logic units 96. One input of each NOR gate receives one of thirteen signal lines 136c, carrying an ASSERT signal from the security state machine 136. The other input of each NOR gate receives one of thirteen PORT ID signals from a RAM 129 via signal lines 129a.

The ASSERT signalling implements static security. When the ASSERT signal is HIGH on any one or more of the signal lines implements eavesdrop security for the corresponding port output; a LOW signal permits the data frame to be passed from the encoder 94 to the corresponding port output.

Which of the signal lines 136c are to be HIGH results from information written by the Network Management (not shown), via the network bus 123, to registers (not shown) contained in the security state machine 136. In the same vein, which output ports are authorized by the source or destination address to receive that data frame is based upon data written to the CAM 122 by the Network Management (not shown).

The RAM 129 also receives the network bus and is, therefore, also written by the Network Management (not shown). The RAM 129, configured to constitute a look-up table, receives the incoming information from the receive ports of the repeater 80 (FIG. 4) via the input bus 81. The RAM 129 includes circuitry that permits it to determine which receive port is then receiving information. This determination is used to access the look-up table to identify which output port(s), if any, will receive the data frame for the receive port then receiving the data frame. As a result, the PORT ID signals for those port outputs not authorized to receive the data frame will be brought HIGH; a LOW on the signal lines 129a identifies those port outputs destined to receive the data frame. The RAM 129 is enabled by signalling from the security state machine 136 when eavesdrop security based upon PORT ID is to be implemented.

OPERATION

Initially, the security state machine 136, the RAM 129, and the CAM 122 are loaded with the information necessary for implementing dynamic or static eavesdrop security on either a transparent or non-transparent basis.

So conditioned, the security state machine 136 (as does the global state machine 84) monitors the receive ports 1-N for activity in the form of a data frame transmission. When data transmission on one of the receive ports 1-N is noted, the security state machine will enable the SA and DA registers 104, 106 for receipt of the source and destination addresses, respectively. At the same time, and at the proper time period, the length register 110 is enabled to receive and hold the length field 36 (FIG. 2) in order to provide the security state machine 136 with information as to the length of the information field 38. At the same time, the byte counter 108 is enabled to count the number of bytes in the information field 38 in order to determine, together with the content of the length register 110, when to add the value created by the FCS Generator 116 when transparent security is implemented.

Dynamic Security

The MPX 112, controlled by the security state machine 136, selects signal line 87, and communicates the incoming data frame to the FCS Generator 116 so that an FCS can be calculated during the receipt of the data frame.

If dynamic address-based security is implemented, the destination address of the incoming data frame is examined by the security state machine 136 to determine if the destination address is an individual address or a group address. Address classification is accomplished by examining the first bit of the destination address. Thus, if the first bit is found to be a one, group addressing is indicated, and the incoming data frame is destined for a multicast group or is being broadcast to all addresses on the network. Multicast data frames initiate or maintain a communication protocol and usually do not contain the actual user data for which protection is intended. No further address-based security processing is normally performed. The incoming data frame is, therefore, repeated on all enabled repeater ports and no dynamic eavesdrop is effected. In certain security environments, however, performing security processing on multicast frames may be desirable. If security for multicast frames may be desirable. If security for multicast frames is selected, the circuitry continues with security processing. Multicast data frames do not effect static eavesdrop security.

If the first bit after start frame delimiter is a zero, an individual node or station address is indicated, and security processing continues. The security state machine 136 continues to monitor the incoming data frame. When enough of the data frame has been received so that the security state machine 136 has sufficient information (i.e., source or destination address), it will select the appropriate register 104, 106 for application to the CAM 122, enable the CAM, which will in turn load its output register (not shown) with the address of the location at which a match between the applied input and the location content is obtained. As indicated above, if more than one match is found, a flag is set indicating that other values are waiting. Control signalling on the control line 136a prompts the CAM to strobe four bits of the CAM's output register to the register file (not shown) contained in the decode circuit 124. If additional matches are found, the identification of their locations are also strobed into the register file (not shown) of the decode 134.

The decode 124 is then enabled by signalling on the DISABLE Line 136b. One or more of the output lines of the decode unit 124 are made HIGH, depending upon the contents of the register file (not shown) of the decode unit 124. Each HIGH corresponds to one of the transmit logic units 96 destined to communicate the receive data frame to the corresponding port output. Those output lines of the decode unit 124 remaining LOW identify corresponding transmit logic units 96 (FIG. 4) destined to receive and pass the 5 MHz bit stream provided by the security logic 100.

The output lines from the decode unit 124 are applied to the array 126 of AND gates. Each AND gate is enabled by (1) the security state machine 136 asserting LOWS on all 13 of the signal lines 136c, and (2) disabling the RAM 129 via control signalling (not shown) to cause the 13 Port ID signals to also be LOW. Thereby, the output of the OR gate array 128 are HIGH enabling the corresponding AND gates of the array 126.

It should be evident that the circuit of FIG. 5 permits addressed-based eavesdrop security selection to be overridden by static eavesdrop security or security based upon port identification (ID). For example, if the RAM 129 is enabled (by the security state machine 136), one or more of the output lines 129a will become HIGH depending upon the receive port receiving the data frame, and which of the port outputs are to be subject to eavesdrop security as a result.

If eavesdrop security is to be dynamically implemented, based solely upon which receive port is receiving the data frame, the security state machine 136 will disable the decode unit 124, forcing all outputs HIGH, and assert all LOWs on the output line 136c. Thus, the individual AND gates of the array 126 are controlled solely by signalling asserted on the output lines 129a, via the OR gate 128.

Similarly, if eavesdrop security is to be solely addressed-based (i.e., based upon the source address or the destination address), the security state machine 136 will disable the RAM 129, causing it to assert LOWs on all of the 13 output lines, and assert LOWs on the output lines 136. Thereby, again via the array 128, the individual AND gates of the array 126 are enabled, and multiplexer selection of the MPXs 130 is controlled by which of the output lines from the decode unit 124 are HIGH.

If eavesdrop security is to be dynamically implemented, and based solely upon the address (source or destination) contained in the incoming data frame, the security state machine 136 will enable the decode unit 124 as soon as it (the security state machine) can determine which port outputs are to be secure, and which are to receive data frame. Thus, for example, if eavesdrop security is based upon the destination address, as soon as the destination address of the data frame is received by the DA register 106 and applied to the security state machine 136, the decode unit 124 can be enabled, causing the corresponding (if any) MPXs 130 to be switched to receive the 5 MHz bit stream output of the security logic 100, via the MPX 134 (also controlled by the state machine 136). Monitoring the byte counter 108, which continues to count the bytes of the information field of the data frame—as received—and comparing that count to the content of length register 110, the security state machine 136 determines when the information field is complete so that it can switch the MPX 134 to communicate the generated FCS from the FCS generator 116 to the port outputs subject to the eavesdrop security.

However, if non-transparent security is implemented, the security state machine 136 will merely cease bit stream transmission when the end of the data frame has been reached.

If, on the other hand, eavesdrop security is based upon which receive port 1-N is active, the RAM 129 can be immediately enabled by the security state machine 136 which, in turn will force corresponding HIGHs switching in a bit stream that, in effect, obliterates virtually all of the data frame. This feature can also be implemented in the transparent mode.

Static Security

Static security, whether transparent or non-transparent, is controlled solely by the security state machine 136, in response to programming from the Network Management (via network bus 123). Thus, the security state machine 136 will assert a HIGH on one or more of the output lines 136c to identify the corresponding port outputs subject to eavesdrop security. Whenever a data frame is received, the security state machine 136 will immediately cause the corresponding MPXs 130 to switch to receipt of the bit stream.

If the static eavesdrop security is to be implemented in transparent mode, the last four bytes of the bit stream will contain the value produced by the FCS generator 116, communicated via the MPX 134 under control of the security state machine 136. Conversely, if eavesdrop security is to be non-transparently implemented, the security state machine 136 will disable eavesdrop security when the end of the data frame is reached.

Bit Substitution

The bit stream generator may generate a fixed, random, or pseudorandom substitute bit pattern. In simple packet security, the substitute bit pattern is arbitrary, but ideally is not a function of the received information field data; consequently the secured frame reveals nothing about the information content of the originally received frame except its addressing and length to eavesdroppers on the secured port(s).

Under certain circumstances, the secured frame may be received by the medium access control sublayer in the station identified in the frame destination address field. To avoid unpredictable results in the upper protocol layers, it is therefore useful to signal to the upper layer when a secured protocol data unit has been received. Signaling can be done by setting, via network management, the value of the first N octets of the formation field output by the bit pattern generator to a single received value. For example, the first 3 octets output by the bit pattern generator could consist of an IEEE 802.2 logical link control destination service access point (DSAP), source service access point (SSAP) and an unnumbered information control field. The DSAP/SSAP could identify this logical link control data unit, medium access control layer information field, as a secured logical link control protocol data unit (PDU) that can be discarded. For upper layer transparent security, in general the initial substitute bit pattern must mimic a valid upper layer protocol data unit header.

Cryptographic techniques may also be employed by the bit pattern generator. With cryptographic technique, the security process bit stream generator is a cryptographic function of the medium access control information field and would have an input from signal line 87. This technique effectively hides the information content of the field, yet enables the information field to be recovered at another intermediate or end station device implementing a bit stream generator with the decryption function. This feature provides confidentiality for the frames destined for stations outside the departmental LAN directly served by the repeater with this security process implemented.

Any number of cryptographic algorithms can be used as long as there is minimum frame delay and no frame expansion. For example a 10 Mb/s bit-oriented encipherment (e.g., the Data Encryption Standard operating in CFB-1 mode of operation) is acceptable. The selection and management of cryptographic keys can be based on fixed keys shared by all repeaters or other cryptographic devices. For more fine-grained security, variable keys that are selected based on the receive port identification, destination address, source address, or transmit port identification are possible, but require more sophisticated key management capabilities. The implementation of multiple cryptographic bit pattern generators allows the use of different algorithms/keys for different transmit ports. The multiple keys may be specified by the user via net management. The key management includes key registers and associated cryptographic algorithms.

Embodiments of the present invention have now been described. Variations and modifications will now be apparent to those of skill in the art. For this reason, the invention should be construed in light of the claims.

What is claimed is:

1. In a local area network having a plurality of input/output devices coupled to a multiport repeater, a method for securing data on the network comprising the steps of:

receiving at the repeater a data frame having a data field and a frame check sequence field;

replacing a content of said data field with a substitute bit pattern to form a secured data field;

replacing a content of said frame check sequence field with a new frame check sequence field calculated from said substitute bit pattern; and wherein a valid secured data frame is formed.

2. The method for securing data of claim 1 further comprising the step of replacing said content of said data field with said substitute bit pattern on all frames transmitted out a given port.

3. The method for securing data of claim 1 further comprising the step of transmitting said secured data frame to a given port.

4. The method for securing data of claim 1 wherein said data frame includes a destination address field and further comprising the step of:

examining said destination address field to determine if said data field is to be secured.

5. The method for securing data of claim 1 wherein said data frame includes a source address field and further comprising the step of:
    examining said source address field to determine if said data field is to be secured.

6. The method for securing data of claim 1 further comprising the steps of examining a repeater port identification at which said data frame was received to determine if said data field is to be secured.

7. The method for securing data of claim 1 further comprising the step of faithfully transmitting unsecured data frames.

8. The method for securing data of claim 1 further comprising the step of examining a first bit after a start frame delimiter of said data frame to determine if said data field is to be secured.

9. In a local area network having a plurality of input/output devices coupled to a multiport repeater, a repeater structure for securing data on the local area network comprising:
    means for replacing a content of a data field of a data frame received at said repeater with a substitute bit pattern to form a secured data field; and
    means for replacing a content of a frame check sequence field of said data frame with a new frame check sequence field calculated from said substitute bit pattern.

10. The repeater structure of claim 9 further comprising:
    means, coupled to an input of said repeater, for identifying a given one of a plurality of data frames received at said repeater to be secured; and
    means, coupled to said means for identifying and to said means for replacing a content of said data field, for activating said means for replacing a content of said data field.

11. In a local area network having a plurality of input/output devices coupled to a multiport repeater, a repeater structure for securing data on the local area network comprising:
    means for replacing a content of a data field of a data frame received at said repeater with a substitute bit pattern to form a secured data field;
    a security selection logic circuit, coupled to a local area network management system, to said means for replacing a content of a data field and to a receive port of said repeater, having:
        (i) means for identifying given ones of a plurality of data frames received at said receive port to be secured;
        (ii) means for activating said means for replacing;
        (ii) means for calculating a frame check sequence field from said substitute bit pattern for said given data frames containing said secured data field.

12. The repeater structure of claim 11 further comprising a means for replacing, with said substitute bit pattern, a remaining content of said data frame located after said frame check sequence field.

13. The repeater structure of claim 11 wherein said means for replacing a content of a data field comprises:
    a bit pattern generator; and
    a multiplexer, having an input coupled to said bit pattern generator, to said security selection logic circuit and to an encoder of said repeater, and having an output coupled to a transmit port of said repeater.

14. The repeater structure of claim 11 wherein said means for replacing a content of a data field is disposed between an encoder of said repeater and a transmit port of said repeater.

15. The repeater structure of claim 11 wherein said means for replacing a content of a data field is disposed between a decoder of said repeater and an elasticity buffer of said repeater.

16. The repeater structure of claim 11 wherein said means for replacing a content of a data field is disposed between an elasticity buffer of said repeater and an encoder of said repeater.

17. The method for securing data of claim 1 further comprising the step of examining a characteristic of said data frame to determine if said data frame is to be secured.

18. The method for securing data of claim 1 wherein said step of replacing a content of a data field further comprises the step of:
    cryptographically replacing the content of said data field.

* * * * *